US011112995B2

(12) United States Patent
Bakke et al.

(10) Patent No.: US 11,112,995 B2
(45) Date of Patent: Sep. 7, 2021

(54) SYSTEMS AND METHODS FOR RANDOM TO SEQUENTIAL STORAGE MAPPING

(71) Applicant: Atavium, Inc., Plymouth, MN (US)

(72) Inventors: Mark A. Bakke, Maple Grove, MN (US); Edward Fiore, Ramsey, MN (US); Michael J. Klemm, Minnetonka, MN (US); Marc David Olin, Edina, MN (US)

(73) Assignee: Atavium, Inc., Minnetonka, MN (US)

( * ) Notice: Subject to any disclaimer, the term of this patent is extended or adjusted under 35 U.S.C. 154(b) by 0 days.

(21) Appl. No.: 15/796,234

(22) Filed: Oct. 27, 2017

(65) Prior Publication Data
US 2018/0121133 A1 May 3, 2018

Related U.S. Application Data
(60) Provisional application No. 62/414,255, filed on Oct. 28, 2016.

(51) Int. Cl.
*G06F 3/06* (2006.01)

(52) U.S. Cl.
CPC ............ *G06F 3/0656* (2013.01); *G06F 3/061* (2013.01); *G06F 3/0608* (2013.01); *G06F 3/0683* (2013.01); *G06F 3/0685* (2013.01)

(58) Field of Classification Search
CPC ...... G06F 3/0656; G06F 3/061; G06F 3/0685; G06F 3/0608; G06F 3/0683
See application file for complete search history.

(56) References Cited

U.S. PATENT DOCUMENTS

| | | | | |
|---|---|---|---|---|
| 5,548,751 | A | * | 8/1996 | Ryu ...................... G06F 3/0601 |
| 5,557,770 | A | * | 9/1996 | Bhide ................... G06F 3/0601 |
| | | | | 711/114 |
| 5,729,732 | A | * | 3/1998 | Gal .......................... G06F 7/24 |

(Continued)

FOREIGN PATENT DOCUMENTS

EP 0446940 3/1991

OTHER PUBLICATIONS

International Search Report and Written Opinion for related PCT Application No. PCT/US2017/058791 dated Jan. 12, 2018 (10 pages).

(Continued)

*Primary Examiner* — Francisco A Grullon
(74) *Attorney, Agent, or Firm* — Schwegman Lundberg & Woessner, P.A.

(57) ABSTRACT

Systems and methods for mapping random data writes to sequential or semi-sequential storage. Data writes may be initially directed to an SSD or other relatively low latency and high IOPS data storage layer. The data may remain in the SSD storage layer until a group of data may be written, together, to a sequential or semi-sequential storage layer. A data organizer may group the data into data buckets based on tags and/or policies associated with the data. In this way, data subject to similar lifetime, priority, data protection, and/or other policies may be stored on a same segment or other portion of the sequential storage layer. Similarly, data having similar access patterns, authors, files, objects, or project affiliations, may be stored together on a same segment of the sequential storage layer.

21 Claims, 5 Drawing Sheets

(56) References Cited

U.S. PATENT DOCUMENTS

| | | | |
|---|---|---|---|
| 6,449,695 B1* | 9/2002 | Bereznyi | G06F 12/123 |
| | | | 707/E17.12 |
| 7,747,657 B2 | 6/2010 | Singh | |
| 8,694,497 B2 | 4/2014 | Bacher et al. | |
| 8,868,620 B2 | 10/2014 | Singh | |
| 8,935,493 B1* | 1/2015 | Dolan | G06F 3/0649 |
| | | | 711/161 |
| 8,983,197 B2 | 3/2015 | Fork et al. | |
| 9,134,917 B2* | 9/2015 | Kimmel | G06F 3/061 |
| 9,229,657 B1* | 1/2016 | Rus | G06F 3/0643 |
| 10,528,262 B1* | 1/2020 | Shmuylovich | G06F 3/0604 |
| 2005/0246452 A1* | 11/2005 | Spencer | H04L 47/32 |
| | | | 709/250 |
| 2005/0261891 A1 | 11/2005 | Chan et al. | |
| 2006/0265689 A1 | 11/2006 | Kuznetsov et al. | |
| 2007/0226810 A1 | 9/2007 | Hotti | |
| 2009/0157756 A1* | 6/2009 | Sanvido | G06F 3/061 |
| 2009/0222395 A1 | 9/2009 | Light et al. | |
| 2009/0254336 A1 | 10/2009 | Dumais et al. | |
| 2010/0281078 A1* | 11/2010 | Wang | G06F 16/24532 |
| | | | 707/812 |
| 2013/0097260 A1 | 4/2013 | Lee | |
| 2013/0238575 A1* | 9/2013 | Amarendran | G06F 16/21 |
| | | | 707/694 |
| 2014/0068208 A1* | 3/2014 | Feldman | G06F 11/1076 |
| | | | 711/162 |
| 2015/0212938 A1 | 7/2015 | Chen et al. | |
| 2015/0286701 A1* | 10/2015 | Wideman | G06F 16/285 |
| | | | 707/737 |
| 2015/0302038 A1* | 10/2015 | Bordawekar | G06F 16/2237 |
| | | | 707/753 |
| 2016/0140146 A1 | 5/2016 | Wexler et al. | |
| 2016/0246784 A1 | 8/2016 | Chakerian et al. | |
| 2016/0267930 A1 | 9/2016 | Chu et al. | |
| 2018/0052765 A1* | 2/2018 | Imbierski | G06F 12/023 |

OTHER PUBLICATIONS

International Search Report and Written Opinion for related PCT Application No. PCT/US2017/058798 dated Jan. 12, 2018 (10 pages).

International Search Report and Written Opinion for related PCT Application No. PCT/US2017/058807 dated Jan. 18, 2018 (9 pages).

"European Application Serial No. 17865426.5, Extended European Search Report dated Jun. 15, 2020", 10pgs.

Pitchumani, Rekha, et al., "SMRDB: Key-Value Data Store for Shingled Magnetic Recording Disks", Proceedings of the 8th ACM International Systems and Storage Conference ON. SYSTOR '15, Haifa, Israel, (May 28, 2015), 1-11.

"European Application Serial No. 17865426.5, Response filed Jan. 11, 2021 to Extended European Search Report dated Jun. 15, 2020", 25 pgs.

* cited by examiner

SYSTEMS AND METHODS FOR RANDOM TO SEQUENTIAL STORAGE MAPPING

CROSS-REFERENCE TO RELATED APPLICATIONS

The present application claims priority to U.S. Provisional Application No. 62/414,255, entitled Random Data to Sequential Storage Mapping, and filed Oct. 28, 2016, the content of which is hereby incorporated by reference herein in its entirety.

FIELD OF THE INVENTION

The present disclosure relates to data handling and storage systems. Particularly, the present disclosure relates to systems and methods for optimizing sequential storage. More particularly, the present disclosure relates to systems and methods for mapping random data writes to sequential or semi-sequential storage.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Data storage systems and data handling systems often use sequential, or semi-sequential access storage media, such as that provided by shingled magnetic recording (SMR) disk drives, low drive-write-per-day (DWPD) flash drives, key/value storage devices, and object stores. While sequential and semi-sequential storage media often provide relatively low cost and high density storage options, these types of storage devices can be relatively slow or inefficient. Sequential and semi-sequential access storage media can have high latency times and/or low input/output operations per second (IOPS). Moreover, such sequential access media generally do not allow for random writes within a file, object, or address space. Instead, sequential storage is often written in zones of varying granularity, and modifications may require that surrounding data be simultaneously overwritten. Another type of data storage device is a solid state drive (SSD). Solid state drives may provide relatively low latency times and/or high IOPS. However, SSD storage is typically relatively high cost and low capacity. Accordingly, there is a need in the art for improved systems and methods for data storage. More particularly, there is a need in the art for systems and methods providing random to sequential storage mapping.

BRIEF SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

The present disclosure, in one or more embodiments, relates to a data storage system having a first storage layer with a first type of storage device and a second storage layer with a second type of storage device different from the first type. The data storage system may additionally have an I/O manager directing incoming write requests to the first storage layer, and a data organizer. The data organizer may organize the data stored on the first storage layer into data buckets, wherein a data bucket may include data having at least one similar attribute. Moreover, when a data bucket reaches a quota, the data organizer may move the data in the bucket from the first storage layer to the second storage layer. The first storage layer may include one or more solid state drives, such as one or more flash storage devices. The second storage layer may include one or more sequential or semi-sequential storage devices, such as one or more shingled magnetic recording devices. Organizing the data stored on the first storage layer into data buckets may include reviewing one or more tags associated with the data to determine the at least one similar attribute. Moreover, the at least one attribute may relate to a data lifetime policy, a data priority policy, a data protection policy, or temporal locality. In some embodiments, the I/O manager may additionally direct incoming read requests to either of the first storage layer and the second storage layer, depending on where the relevant data is stored. The data organizer may additionally move data from the second storage layer to the first storage layer based on one or more policies. In some embodiments, the data storage system may have a segment manager searching the second storage layer for available storage space. The segment manager may maintain a record of available space on the second storage layer.

The present disclosure, in one or more embodiments, additionally relates to a method for storing data. The method may include receiving a write request for data, writing the data to a first storage layer having a first type of storage device, grouping the data with data having at least one similar attribute, and moving the grouped data to a second storage layer having a second type of storage device. In some embodiments, the method may additionally include performing a data policy operation with respect to the grouped data. Moreover, grouping the data with data having at least one similar attribute may include placing the data in a data bucket based on one or more tags associated with the data. The one or more tags may relate to data lifetime policy, a data priority policy, a data protection policy, and/or temporal locality.

The present disclosure, in one or more embodiments, additionally relates to a data handling system having an I/O manager directing incoming writes to a first storage layer, the first storage layer having a first type of data storage device. The data handling system may additionally have a data organizer organizing the data stored on the first storage layer into data buckets, wherein a data bucket includes data having at least one similar attributes. When a data bucket reaches a quota, the data organizer may move the data in the bucket from the first storage layer to a second storage layer having a second type of data storage device different from the first type. In some embodiments, organizing the data stored on the first storage layer into data buckets may include reviewing one or more tags associated with the data.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

The present disclosure relates to novel and advantageous data storage systems. Particularly, the present disclosure relates to novel and advantageous systems and methods for mapping random data writes to sequential or semi-sequential storage. In some embodiments of the present disclosure, data writes may be initially directed to an SSD or other relatively low latency and high IOPS data storage layer. The data may remain in the SSD storage layer until a group of data may be written, together, to a sequential or semi-sequential storage layer. A data organizer may group the data into data buckets based on tags and/or policies associated with the data. In this way, data subject to similar lifetime, priority, data protection, and/or other policies may be stored on a same segment or other portion of the sequential storage layer. Similarly, data having similar access patterns, authors, files, objects, or project affiliations, may be stored together on a same segment of the sequential storage layer. The systems and methods of the present disclosure may leverage the relatively high speed and low latency of SSD storage, together with the high efficiency and storage capacity of sequential storage. The systems and methods described herein allow random access to sequential access mapping, particularly for relatively high bandwidth applications and large data sets. Moreover, the systems and methods described herein may provide for effective use of cloud storage for elasticity and data movement.

Figure 1:
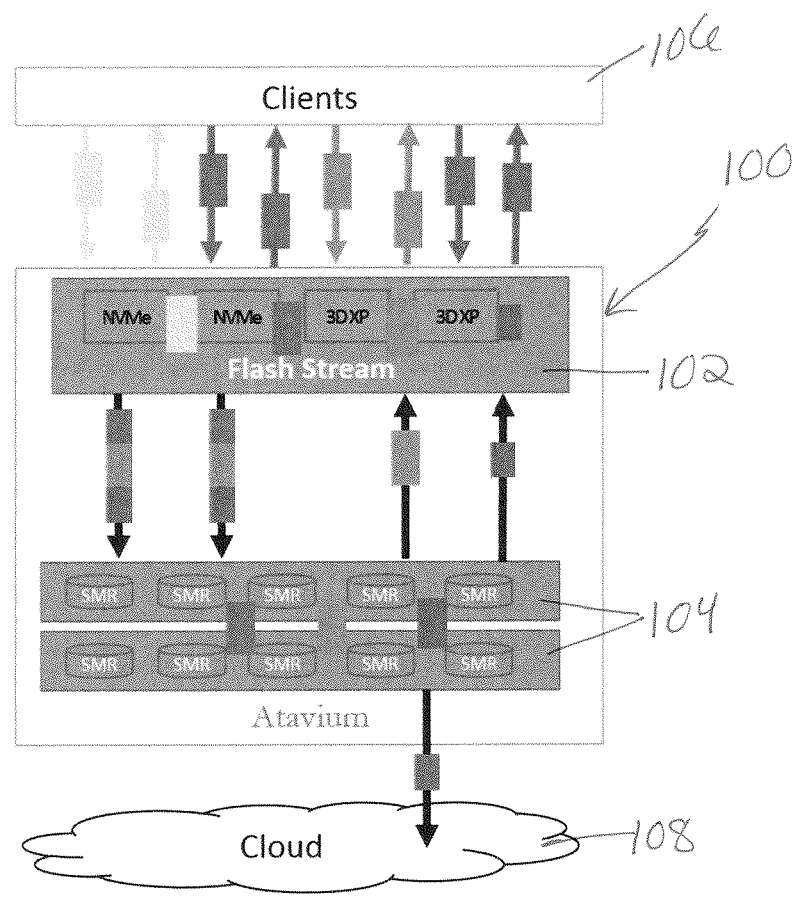
FIG. 1 is a conceptual diagram of a data storage system of the present disclosure, according to one or more embodiments.

Turning now to FIG. 1, a conceptual diagram showing one example of a data storage system 100 of the present disclosure is shown. The data storage system 100 may have flash or SSD storage space 102, as well as sequential storage space 104, such as SMR storage space. Write requests from one or more clients 106 or other users may be received at, or sent first to, the flash storage 102. The individual writes may be written to the flash storage 102 in a random access manner. That is, the writes may be written to the flash storage 102 in the order they are received, or in any suitable order. The individual writes may remain in flash storage 102 for any suitable period of time. In some embodiments, individual writes may remain in flash storage 102 until enough writes may be grouped together to write a zone or segment of the sequential storage space 104. As a particular example, SMR storage may be written in approximately 256 MB zones or segments in some embodiments. When there are enough writes in the flash storage 102 to write to a 256 MB segment, the data may be written together to the sequential storage 104. In other embodiments, data may be written in zones or segments having any other suitable size.

In some embodiments, data may be grouped into particular buckets before it is written to the sequential storage 104. For example, the data writes stored in the flash storage 102 may be grouped based on metadata and/or other attributes about or associated with the data before being written to the sequential storage 104. In some embodiments, the data writes may be grouped based on tags associated with the data. Tags may be labels or categories that are assigned to or associated with particular files and/or objects. Tags may relate to various information or attributes about the data. For example, in some embodiments, a tag may identify frequently accessed data. Other tags may represent data that is frequently used together or data that corresponds to a same application, project, user, or other attribute, for example. Tags may be defined manually by a user, such as a client or administrator. In some embodiments, tags may be defined automatically by a system, or partially automatically based on one or more predefined parameters. In some embodiments, tags may relate to metadata. In general, tags may be customizable, such that a client, administrator, or other user may tag data based on any desired parameters or qualifications. Tags are described in more detail in U.S. Patent Application entitled Systems and Methods for Data Management Using Zero-Touch Tagging, filed the same day as the present application on Oct. 27, 2017, and having U.S. patent application Ser. No. 15/795,882, the content of which is hereby incorporated by reference herein in its entirety. In general, tags may be used to categorize or group data, such that a policy may be defined for all of the data associated with a particular tag or set of tags.

A policy may provide for one or more particular operations to be performed with respect to associated data. For example, a policy may relate to data life, priority, protection, location, security, or other operations. As one particular example, a policy may provide that data associated with "Tag A" is to be deleted after 2 years. Another example of a policy is data associated with "Tag B" is to be moved to flash storage on the last day of each month, and returned to sequential storage or other storage on the first day of each month. Policies are further described in U.S. patent application Ser. No. 15/795,882, previously incorporated by reference. In general, tags and policies may be used to determine where a data write came from and/or how it is to be used.

Below are some examples of policies that may be used according to various embodiments of the present disclosure to determine how to group data together for storage purposes. In some embodiments, each policy may correspond with one or more tags.

Data Lifetime: A data lifetime policy may specify a length of time that a data file or object should remain in a system. Additionally or alternatively, a data lifetime policy may designate when and how data should be moved between different storage locations or classifications of storage. For example, a lifetime policy may designate that data should be moved to archive storage after two years in sequential storage. Data may be grouped together by same or similar lifetime policies or requirements because the data may be expected to be moved or removed at a same time in accordance with the applicable policies. For example, data subject to policies having a storage period within a particular time range may be grouped together. Similarly, data subject to policies having a transfer date within a particular date range may be grouped together. In this way, all of the data within the group may be moved or transferred within the particular range, in accordance with the policies.

Priority: A data priority policy may relate to an importance of corresponding data and/or one or more performance needs for the data. For example, high performance data may use more disks and/or data storage space. In some embodiments, data priority may be designated by one or more service level agreements. Data may be grouped together by same or similar priority levels to make more efficient use of data storage space. For example, data subject to "high" priority policies may be grouped together. Similarly, data subject to "medium" priority policies may be grouped together, and data subject to "low" priority policies may be grouped together. In some embodiments, data having medium and low priority policies may be grouped together.

Data Protection: A data protection policy may relate to number of disk failures, appliance failures, or system failures that data may be configured to sustain. In some embodiments, data protection may be designated by one or more service level agreements. Data may be grouped together by same or similar protection levels to make more efficient use of data storage space. As a particular example, one data object may have a first protection policy designating that the object should be protected against two individual disk failures. This data object may then be placed on space configured to survive two disk failures while still serving the data. A second data object may have a second protection policy designated that the second object should be protected against two disk failures and an appliance failure. The second object may then be placed on space configured to survive those failures while still serving the data. In some embodiments, the first and second objects may be stored on the same disk space, but subject to different software protection schemes. In general, data subject to policies dictating a same number of disk failures, appliance, failures, system failures, and/or other protection parameters may be grouped together in storage space configured for such data protection.

Temporal Locality: In some embodiments, data may be grouped based on temporal locality. Temporal locality may be defined by a policy, or may relate to metadata or tags associated with data writes. This type of policy, tagging, or grouping may assume that data written within a relatively short period of time may likely be related, and may be accessed together. Temporal locality may be determined, for example, based on when data is received in the system. Data received within a relatively short time range or date range may be grouped together. Similarly, temporal locality may be based on data creation date. Data having creation dates within a relatively short time range or date range may be grouped together.

Compression and Encryption: In some embodiments, compression and encryption policies may be used to group data together, such that data subject to similar encryption and/or compression requirements may be grouped together. However, in other embodiments, the policies may be disregarded when grouping data for movement to sequential storage. That is, in some embodiments, data subject to different encryption and/or compression requirements may be stored on same disks, segments, or tracks, as these policies may not affect the access pattern and/or lifetime of the data.

With continued reference to FIG. 1, data may generally be read as needed, whether it is stored in the flash storage 102 and sequential storage 104. However, in some embodiments, data in sequential storage 104 may be transferred back to the flash storage 102 as desired or needed. For example, when a policy and/or tagging indicates that a group of data may be subject to frequent reads and/or writes in the near future, the group of data may be moved to flash storage 102. Moreover, in some embodiments, data may be moved or replicated to cloud storage 108 and/or other storage types or devices. For example, archived data may be moved to cloud storage 108 in some embodiments.

Figure 2:
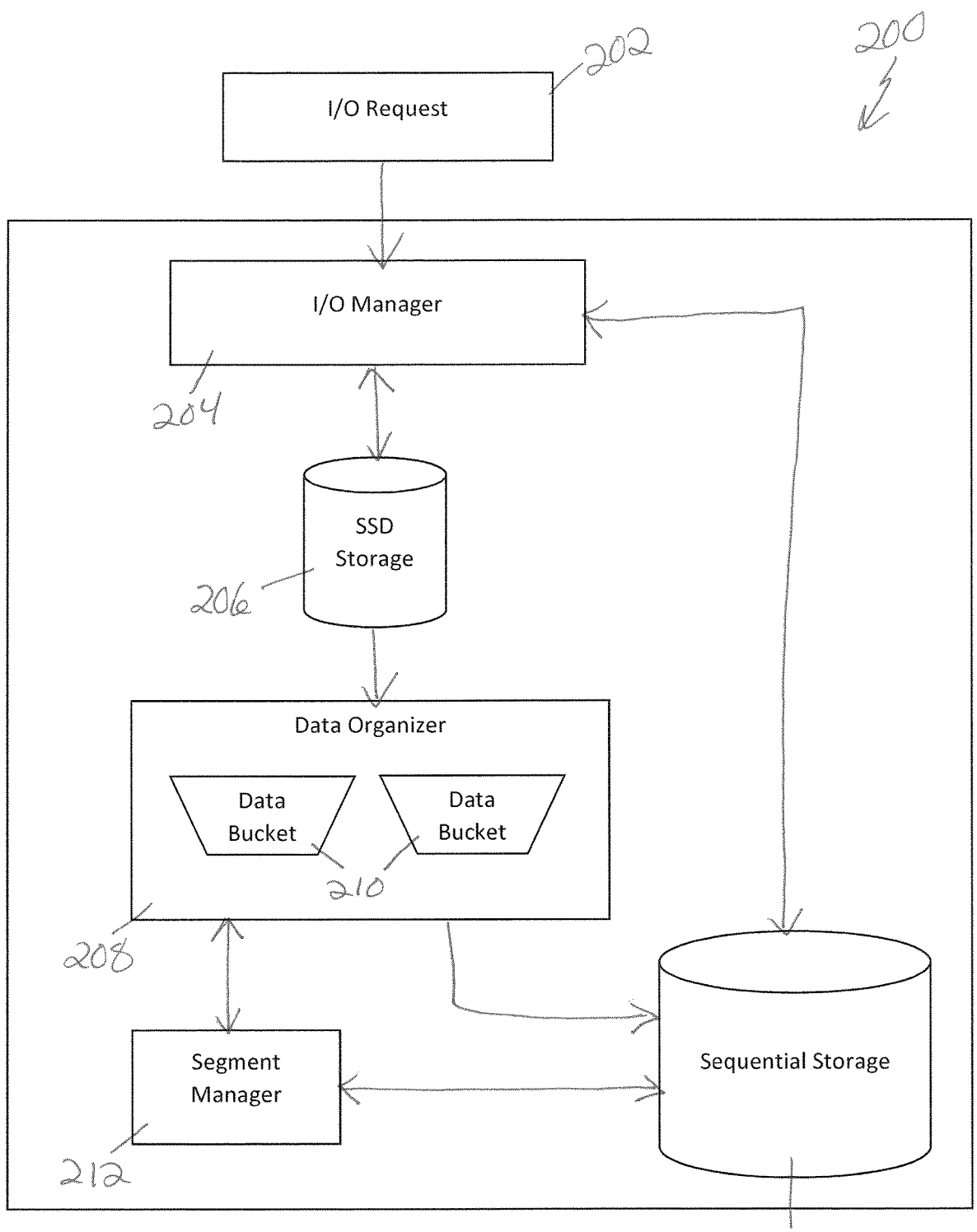
FIG. 2 is a diagram of a data management system of the present disclosure, according to one or more embodiments.

Turning now to FIG. 2, a system 200 of the present disclosure is shown. The system 200 may generally include an I/O manager 204, an SSD storage device 206, a data organizer 208, a segment manager 212, and a sequential storage device 214. In some embodiments, the system 200 may include additional and/or alternative components. The system 200 may be configured to receive I/O requests 202, including read and write requests, from one or more clients or other users. Users may be local or remote. In some embodiments, the system 200 may receive requests 202 from a plurality of remote users.

The I/O manager 204 may be configured for handling and directing incoming read and write requests from one or more clients or other users. With respect to write requests, the I/O manager 204 may direct write requests to the SSD storage 206. In some embodiments, all or substantially all write requests may be directed to SSD storage 206. In other embodiments, a portion of write requests may be directed to SSD storage 206. With respect to read requests, the I/O manager 204 may direct requests to the storage location of the data requested. For example, where data is stored in SSD storage 206, the I/O manager 204 may direct the read request there. Where data is stored in the sequential storage 214, the I/O manager 204 may direct the read request to sequential storage. In some embodiments, the I/O manager 204 may operate to mask the different types or sources of data storage in the system. That is, a user may generally not be aware that some data is stored in SSD storage 206 while other data is stored in sequential storage 214 and/or other types of storage.

The I/O manager 204 may include only hardware, only software, or a combination of hardware and software. For example, in some embodiments, the I/O manager 204 may include hardware, such as for example a controller, processor, hardware circuitry, and/or other hardware components described herein. Hardware circuitry may include receiving hardware circuitry, data accessing or retrieving hardware circuitry, sending hardware circuitry, or other hardware circuitry. The controller, processor, hardware circuitry, and/or other hardware components may be configured to run or operate one or more software programs or applications for receiving data and communicating data to the SSD storage 206, sequential storage 214, and/or other storage or other components of the system. Moreover, in some embodiments, the I/O manager 204 may be described as a layer, component, module, or element of a system. Such layer, component, module, or element may include hardware and/or software, as described above, for performing the above-described operations of the I/O manager 204.

The SSD storage 206 may include, for example, one or more flash storage devices. In some embodiments, the SSD storage 206 may include one or more non-volatile memory express (NVMe) devices, non-volatile random access memory (NVRAM) devices, and/or other types of device or storage. In particular embodiments, the system may include between approximately 4 and 24 NVMe SSD devices. In some embodiments, the SSD storage 206 may include more than one database, file system, or object bucket. The SSD storage 206 may store data for multiple users or clients, or for a particular user or client. The SSD storage 206 may be provided by, or owned by, a particular client or user. The SSD storage 206 may be remote and/or local to the users and/or other system components. Further, it is to be appreciated that, while described herein as SSD storage 206, there may be some embodiments where the SSD storage layer includes storage devices that are not solid state drives, but that are configured to deliver relatively low latency and relatively high IOPS, similar to some SSD storage devices.

The SSD storage 206 may generally store data until it can be moved to sequential storage 214. In this way, the SSD storage 206 may store data that is to be grouped or organized into buckets by the data organizer 208, as described below. However, it is to be appreciated that the SSD storage 206 is not being provided as a mere temporary write cache. That is, data stored on the SSD storage 206 may remain there for any suitable length of time, until the data may be grouped with other or similar data for migration to sequential storage 214. Additionally, in some embodiments, the SSD storage 206 may store other data, such as data that is frequently accessed and may not be suitable for sequential storage 214.

Figure 3:
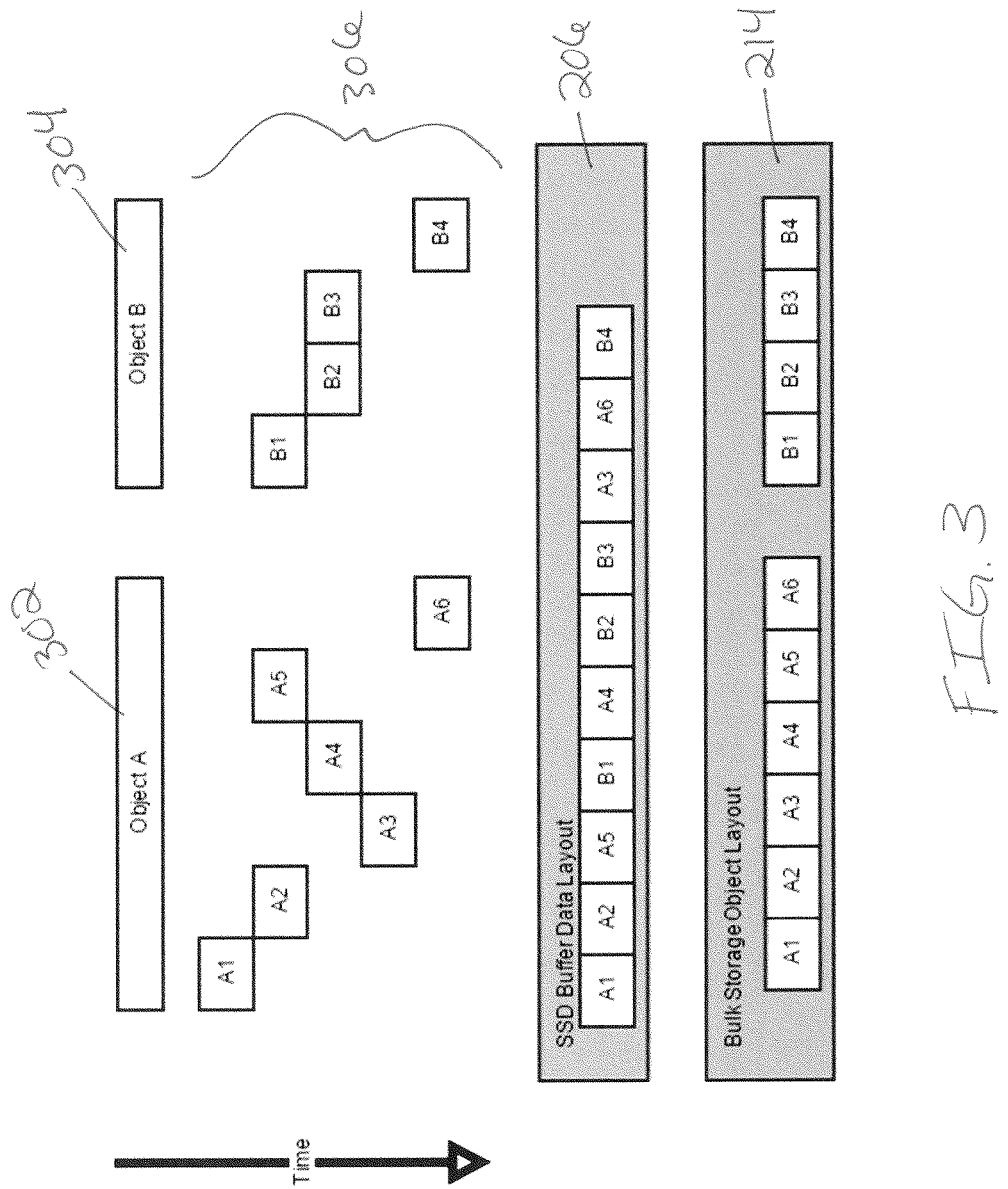
FIG. 3 is a conceptual diagram of data grouping of the present disclosure, according to one or more embodiments.

The data organizer 208 may be configured to monitor data being written to SSD storage 206, organize the data, and write data to the sequential storage 214. In some embodiments, the data organizer 208 may group the data to be moved to sequential storage 214. For example, data having one or more matching or corresponding tags, metadata, and/or other attributes may be grouped together and written as a group to sequential storage 214. In this way, the data organizer 208 may monitor new writes to SSD storage 206 in order to group corresponding data together to be written to sequential storage 214. FIG. 3 illustrates one embodiment of the data organizer 208 grouping together similar or corresponding data writes to be written to sequential storage 214. As shown in FIG. 3, data writes 306 for two different objects, Object A 302 and Object B 304, may be written to the system at non-sequential or random times. Moreover, the data writes 306 may be received from a variety of sources. The data writes 306 for both objects may be written to SSD storage 206 generally or substantially in the order in which they are received. That is, in SSD storage 206, writes corresponding to the Object A 302 may be adjacent to or intermixed with writes corresponding to Object B 304. However, before the data is written to sequential storage 214, the data organizer 208 may group together Object A 302 writes and Object B 304 writes. The Object A 302 writes may be written together, and the Object B 304 writes may be written together. Additionally the data organizer 208 may organize the data writes in any desirable order to increase read performance, for example.

The data organizer 208 may use one or more algorithms for grouping data writes in and/or organizing the data writes. For example, and as shown in FIG. 2, the data organizer 208 may conceptually group data into a plurality of data buckets 210. Each data bucket 210 may relate to one or more data tags, metadata, and/or other data attributes. In this way, the data organizer 208 may monitor data written to SSD storage 206 to determine which data bucket 210 the data corresponds with. Data with one or more of the same tag(s), metadata, and/or other attribute(s) may be grouped together in a same data bucket 210. In some embodiments, data may be associated with more than one bucket 210 based on its various tags and/or other attributes. Where data is associated with more than one bucket 210, the data may be moved to sequential storage 214 with the group of data corresponding to the bucket that first fills or first reaches a quota. Once the data is moved to sequential storage 214, the data may be removed from any other buckets 210 with which it is associated. Data buckets 210 may be created automatically in some embodiments. For example, if the data write does not correspond with any data bucket 210, the data organizer 208 may create a new data bucket. Data buckets 210 may generally correspond with the data that is currently in the SSD storage 206 and awaiting transfer to the sequential storage 214 at any given time. In other embodiments, data buckets 210 may be manually or partially manually created, such as by a user or based on one or more predefined parameters. It is to be appreciated that data buckets 210 may be conceptual groups for identifying data based on tagging or other attributes associated with the data. That is, organizing the data into data buckets 210 may not necessarily include moving the data or storing the data in a particular location or group. However, in other embodiments, data buckets 210 may be storage containers in which data is stored or moved on the SSD storage 206 or other storage.

In some embodiments, data buckets 210 may have data limits or quotas, such that if a data bucket becomes full or otherwise meets a quota, the data organizer 208 may write the grouped data to sequential storage 214. Quotas of the data buckets 210 may correspond with segment sizes of the sequential storage 214 in some embodiments. For example, if the sequential storage 214 has 256 MB segments, at least some data buckets 210 may have quotas or data limits of approximately 256 MB. In this way, when a data bucket 210 having similar or corresponding data (i.e. data having at least one matching tag, metadata, and/or other attribute) is full or nearly full, the data in the data bucket may be written together as a segment in sequential storage 214.

The data organizer 208 may group data based on particular data tags and policies. In some embodiments, the data organizer 208 may group data based on an order of policies. For example, the data organizer 208 may first group data together based on data protection policies, as described above. The data organizer may next group data based on priority policies, such that data having same or similar priority requirements may be grouped together when written to sequential storage 214. Third, the data organizer 208 may group data based on data lifetime policies. For example, algorithms may be used to determine when data is configured to expire or move based on lifetime policies and creation dates. In some embodiments, a range of dates or times may be used such that, for example, all data configured to expire within a particular week may be grouped together. Fourth, the data organizer 208 may group data based on any other polic(ies), tag(s), and/or other attribute(s). For example, the data may be grouped based on project name, creation time, or access time, as designated by one or more tags or metadata. In other embodiments, the data may be grouped based on any other suitable polic(ies) and/or tag(s). Moreover, the policies and/or tags may be considered in any suitable order.

Figure 4:
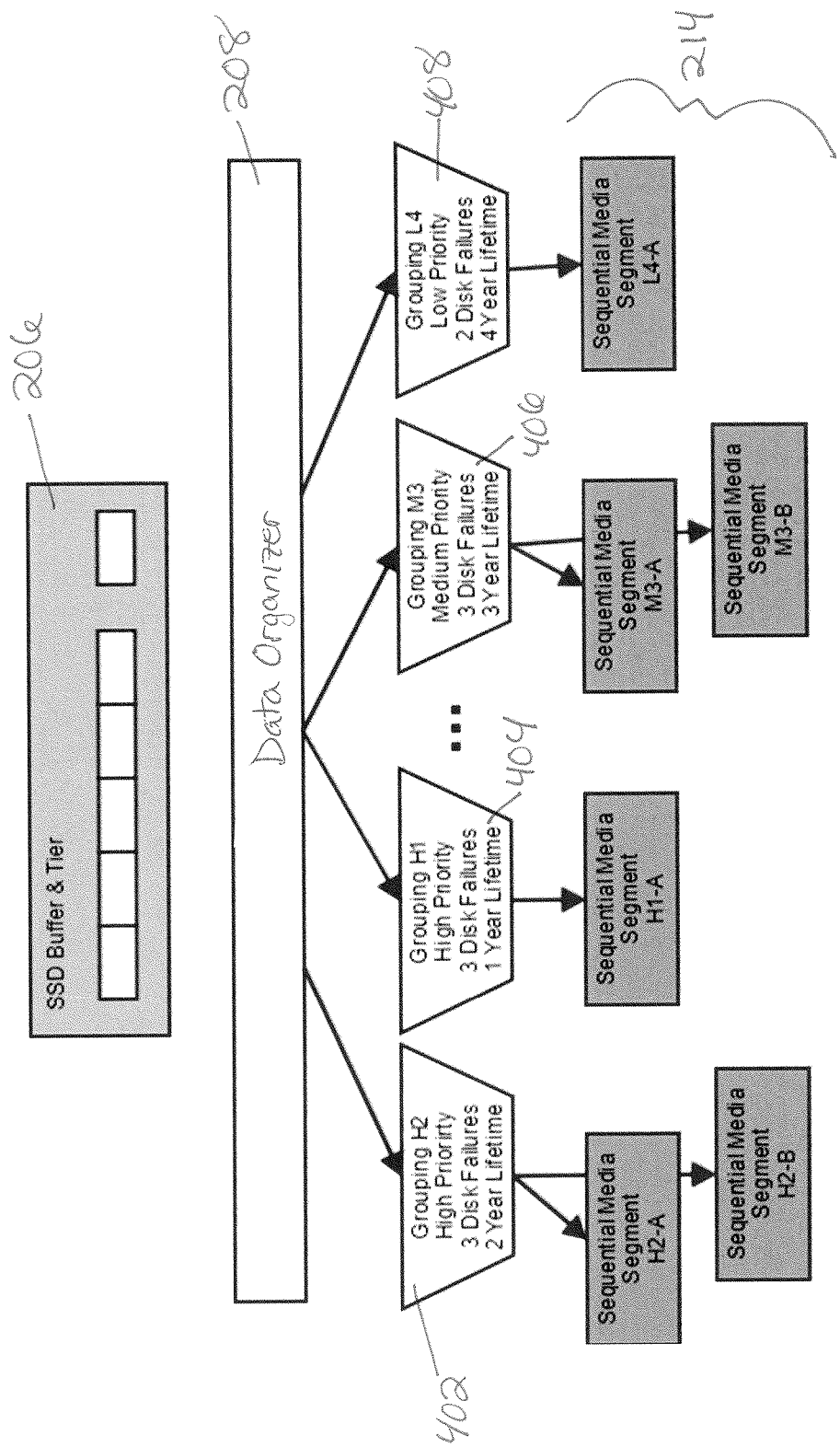
FIG. 4 is a conceptual diagram of data bucket grouping of the present disclosure, according to one or more embodiments.

FIG. 4 illustrates one embodiment of different data buckets that may be used to sort data writes based on a plurality of data policies. As shown, a first data bucket 402 may group data writes subject to a high priority policy, three disk failure data protection policy, and a two year lifetime. A second data bucket 404 may group data writes subject to a high priority policy, three disk failure data protection policy, and a one year lifetime. A third data bucket 406 may group data writes subject to a medium priority policy, three disk failure data protection policy, and a three year lifetime. A fourth data bucket 408 may group data writes based on a low priority policy, two disk failure data protection policy, and a four year lifetime. Data within each bucket may be written sequentially to one or more segments in sequential storage 214.

When a data bucket quota is met, or when data in SSD storage 206 is otherwise ready to move to sequential storage 214, the data organizer 208 may transfer or initiate transfer of the data from SSD storage to sequential storage. When data is written to sequential storage 214, it may be removed from SSD storage 206 in some embodiments. In some embodiments, the data organizer 208 may transfer grouped data, or data related to a same object or file, or data that may be accessed together or substantially together, to a minimal number of physical disk locations. That is, when possible due to parity and priority parameters, available space, and other factors, grouped data may be placed on a single physical disk to minimize a total number of I/Os necessary to retrieve the group of data. In some embodiments, larger groups, objects, or files may be divided onto multiple disks to improve read performance.

In some embodiments, the data organizer 208 may additionally be configured to transfer data from sequential storage 214 to SSD storage 206. For example, one or more access patterns, tags, policies, and/or metadata attributes may designate that data should be moved to SSD storage 206 at a predetermined time. The data organizer 208 may determine when the data should be moved from sequential storage 214 to SSD storage 206, and may move the data as needed. If the data is later no longer needed on SSD storage 206, the data organizer 208 may move the data back to sequential storage 214. In some embodiments, the data may be stored in a different location when it is returned to sequential storage 214, and may be grouped with different data, such as in a different bucket 210. Moreover, the data organizer 208 may additionally be configured to transfer data to cloud storage and/or other storage devices or types. In some embodiments, cloud storage may be used for archival data and/or other data needs. Moreover, other storage types and/or devices may be used in a system of the present disclosure. The data organizer 208 may move data among these different storage locations as needed or as defined by tagging and/or policies, for example.

The data organizer 208 may include only hardware, only software, or a combination of hardware and software. For example, in some embodiments, the data organizer 208 may include hardware, such as for example a controller, processor, hardware circuitry, and/or other hardware components described herein. Hardware circuitry may include receiving hardware circuitry, data organizing hardware circuitry, data grouping hardware circuitry, data bucket hardware circuitry, data monitoring hardware circuitry, data storing hardware circuitry, sending hardware circuitry, or other hardware circuitry. The controller, processer, hardware circuitry, and/or other hardware components may be configured to run or operate one or more software programs or applications for monitoring data, organizing and/or grouping data, sending data to the SSD storage 206, sequential storage 214, or other storage location, and/or other storage or other components of the system 200. Moreover, in some embodiments, the data organizer 208 may be described as a layer, component, module, or element of a system. Such layer, component, module, or element may include hardware and/or software, as described above, for performing the above-described operations of the data organizer 208.

With continued reference to FIG. 2, the segment manager 212 may monitor sequential storage 214 to locate, track, or gather free space on the sequential storage. For example, the segment manager 212 may determine where there are free, unused, or underused segments on the sequential storage 214 that may be written with grouped data from the SSD storage 206. The segment manager 212 may notify the data organizer 208 of this available space. In some embodiments, the segment manager 212 may locate suitable space for a particular data bucket 210 or a particular group of data. In some embodiments, the segment manager 212 may locate or track available space based on disk properties or other storage properties. For example, where a data bucket 210 requires data be stored on one or more disks having particular parity or other properties, the segment manager 212 may locate suitable space on one or more disks having the desired properties.

The segment manager 212 may include only hardware, only software, or a combination of hardware and software. For example, in some embodiments, the segment manager 212 may include hardware, such as for example a controller, processor, hardware circuitry, and/or other hardware components described herein. Hardware circuitry may include receiving hardware circuitry, storage space locating hardware circuitry, or other hardware circuitry. The controller, processer, hardware circuitry, and/or other hardware components may be configured to run or operate one or more software programs or applications for monitoring or locating available storage space, determining storage space attributes, communicating with the data organizer 208 and sequential storage 214, and/or other storage or other components of the system 200. Moreover, in some embodiments, the segment manager 212 may be described as a layer, component, module, or element of a system. Such layer, component, module, or element may include hardware and/or software, as described above, for performing the above-described operations of the segment manager 212.

The sequential storage 214 may include, for example, one or more shingled magnetic recording (SMR) storage devices. Additionally or alternatively, the sequential storage 214 may include other sequential, semi-sequential, or partially sequential storage devices. Sequential storage 214 may include tape or one or more subsystems containing tape in some embodiments. Sequential storage 214 may be separable into segments, zones, stripes, or other discrete portions that may be written as a unit. As described above, data may be grouped together, such that a sequential storage 214 unit may be written simultaneously. In some particular embodiments, the system 200 may include between approximately 30 and 120 SMR devices. In some embodiments, the sequential storage 214 may include more than one database, file system, or object bucket. The sequential storage 214 may store data for multiple users or clients, or for a particular user or client. The sequential storage 214 may be provided by, or owned by, a particular client or user. The sequential storage may be remote and/or local to the users and/or other system components. Further, it is to be appreciated that, while described herein as sequential storage 214, there may be some embodiments where the sequential storage layer includes storage devices that are not sequential storage devices, but that may generally deliver a relatively high latency and/or low TOPS, and/or that are configured to provide a relatively high density of storage space.

In some embodiments, the system 200 may additionally have a garbage collection engine. The garbage collection engine may include hardware and/or software to help optimize space in the sequential storage. For example, the garbage collection engine may seek stripes or segments that are ready to update or migrate to other storage. The garbage collection engine may compact or compress data where possible. In this way, the garbage collection engine may help to minimize write amplification. The garbage collection may perform these operations while retaining the grouping characteristics of data in the sequential storage. In some embodiments, the garbage collection engine may be part of the segment manager. In other embodiments, the garbage collection engine may be a separate component of the system 200.

Additionally, the system 200 may generally include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, the system 200 or any portion thereof may be a minicomputer, mainframe computer, personal computer (e.g., desktop or laptop), tablet computer, mobile device (e.g., personal digital assistant (PDA) or smart phone) or other hand-held computing device, server (e.g., blade server or rack server), a network storage device, or any other suitable device or combination of devices and may vary in size, shape, performance, functionality, and price. The system 200 may include volatile memory (e.g., random access memory (RAM)), one or more processing resources such as a central processing unit (CPU) or hardware or software control logic, ROM, and/or other types of nonvolatile memory (e.g., EPROM, EEPROM, etc.). A basic input/output system (BIOS) can be stored in the non-volatile memory (e.g., ROM), and may include basic routines facilitating communication of data and signals between components within the system. The volatile memory may additionally include a high-speed RAM, such as static RAM for caching data.

Additional components of the system 200 may include one or more disk drives or one or more mass storage devices, one or more network ports for communicating with external devices as well as various input and output (I/O) devices, such as a keyboard, a mouse, touchscreen and/or a video display. Mass storage devices may include, but are not limited to, a hard disk drive, floppy disk drive, CD-ROM drive, smart drive, flash drive, or other types of non-volatile data storage, a plurality of storage devices, a storage subsystem, or any combination of storage devices. A storage interface may be provided for interfacing with mass storage devices, for example, a storage subsystem. The storage interface may include any suitable interface technology, such as EIDE, ATA, SATA, and IEEE 1394. The system 200 may include what is referred to as a user interface for interacting with the system, which may generally include a display, mouse or other cursor control device, keyboard, button, touchpad, touch screen, stylus, remote control (such as an infrared remote control), microphone, camera, video recorder, gesture systems (e.g., eye movement, head movement, etc.), speaker, LED, light, joystick, game pad, switch, buzzer, bell, and/or other user input/output device for communicating with one or more users or for entering information into the system. These and other devices for interacting with the system 200 may be connected to the system through I/O device interface(s) via a system bus, but can be connected by other interfaces such as a parallel port, IEEE 1394 serial port, a game port, a USB port, an IR interface, etc. Output devices may include any type of device for presenting information to a user, including but not limited to, a computer monitor, flat-screen display, or other visual display, a printer, and/or speakers or any other device for providing information in audio form, such as a telephone, a plurality of output devices, or any combination of output devices.

The system 200 may also generally include one or more buses operable to transmit communications between the various hardware components. A system bus may be any of several types of bus structure that can further interconnect, for example, to a memory bus (with or without a memory controller) and/or a peripheral bus (e.g., PCI, PCIe, AGP, LPC, etc.) using any of a variety of commercially available bus architectures.

One or more programs or applications, such as a web browser, application program interface (API), and/or other executable applications, may be stored in one or more of the system data storage devices. For example, the I/O manager 204, data organizer 208, and segment manager 212 may be or include programs or applications stored in, and configured to run or execute on, the system 200. Generally, programs may include routines, methods, data structures, other software components, etc., that perform particular tasks or implement particular abstract data types. Programs or applications may be loaded in part or in whole into a main memory or processor during execution by the processor. One or more processors may execute applications or programs to run systems or methods of the present disclosure, or portions thereof, stored as executable programs or program code in the memory, or received from the Internet or other network. Any commercial or freeware web browser or other application capable of retrieving content from a network and displaying pages or screens may be used. In some embodiments, a customized application may be used to access, display, and update information. A user may interact with the system, programs, and data stored thereon or accessible thereto using any one or more of the input and output devices described above.

The system 200 may operate in a networked environment using logical connections via a wired and/or wireless communications subsystem to one or more networks and/or other computers. Other computers can include, but are not limited to, workstations, servers, routers, personal computers, microprocessor-based entertainment appliances, peer devices, or other common network nodes, and may generally include many or all of the elements described above. Logical connections may include wired and/or wireless connectivity to a local area network (LAN), a wide area network (WAN), hotspot, a global communications network, such as the Internet, and so on. The system 200 may be operable to communicate with wired and/or wireless devices or other processing entities using, for example, radio technologies, such as the IEEE 802.xx family of standards, and includes at least Wi-Fi (wireless fidelity), WiMax, and Bluetooth wireless technologies. Communications can be made via a predefined structure as with a conventional network or via an ad hoc communication between at least two devices. In some embodiments, some or all of the components, applications, or programs of the system 200 or any system of the present disclosure may be provided as cloud-based components, or may be otherwise provided by, executed on, or supported by, a cloud system.

Figure 5:
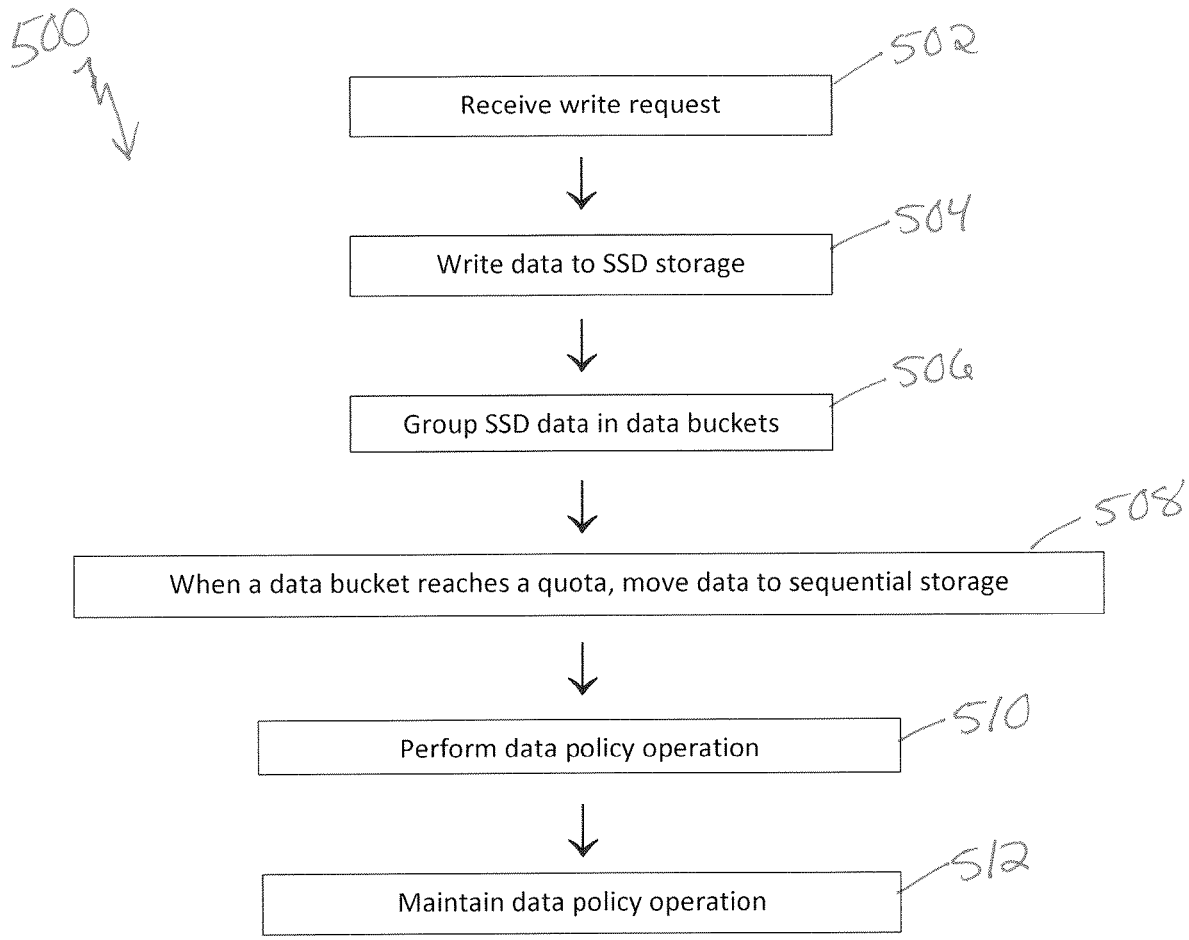
FIG. 5 is a flow diagram of a method of the present disclosure, according to one or more embodiments.

Turning now to FIG. 5, a method 500 for mapping random access data writes to sequential storage, which may be performable by systems of the present disclosure, is shown. The method 500 may include the steps of receiving a write request 502; writing the data for the write request to SSD storage 504; grouping SSD data into data buckets 506; when a data bucket reaches a quota, moving the data to sequential storage 508; and performing applicable data policy operations with respect to the moved data 510. In other embodiments, the method may include additional or alternative steps.

Receiving a write request 502 may include receiving a request to write new data or modify data. The request may be received from one or more remote or local clients or other users or systems. In some embodiments, as described above, the write request may be received by an I/O manager or another component of a system of the present disclosure. The data related to the write request may be written to SSD storage 504, such as flash storage or another suitable storage location. In the SSD storage, the data may be grouped into one or more data buckets 506. As described above, a data bucket may be a group of data that contains similar tagging, metadata, and/or other attributes. The data may remain in SSD storage until it can be grouped with other data and written to sequential storage. In this way, the data may remain in SSD storage for generally any suitable amount of time until there is enough data having similar tagging or other attributes to send to sequential storage. Once a data bucket reaches a predetermined quota or threshold, or it is otherwise determined that data in the bucket is suitable for migration, the data in the bucket may be moved to sequential storage 508. As described above, the data may be written as a segment to available space in the sequential storage. Once the data is written to sequential storage, it may be removed from the SSD storage.

Additionally, the method 500 may include performing any applicable policy operations associated with the data 510. For example, the data may be subject to a policy requiring migration of the data back to SSD storage at a particular time and/or for a particular period of time. Similarly, the data may be subject to a policy requiring migration to cloud storage, or requiring deletion of the data at a particular time or after a particular time. These policy operations may be performed as prescribed by any policies associated with the data.

Moreover, one or more policy operations may be maintained 512. Maintaining policy operations may include performing additional operations, such as where a policy requires continuous or repeated operations or requirements. Maintaining policy operations may additionally include revising operations or requirements in response to policy modifications. That is, where a policy is modified, maintaining policy operations may include ensuring that updated or revised operations are performed with respect to previously tagged data.

Systems and methods of the present disclosure may generally provide for cost-effective data storage, particularly where large quantities of data are stored, together with relatively fast IOPS performance. These systems and methods may provide for leveraging of relatively high-speed SSD or other storage devices, while serving relatively high-bandwidth applications for large data sets, making use of the space efficiency sequential storage. The SSD storage described herein may operate as a buffer layer, allowing the system to collect and organize random user writes before writing segments to sequential storage. Read latency of the system may be reduced by storing like data within a same segment of the sequential storage, and minimizing a number of physical disks on which like data is stored. As described above, tagging may provide contextual information from which the data organizer may group like data. Moreover, write latency may be reduced by directing incoming writes to SSD or other relatively high-performing random access data storage. Write amplification may also be reduced by grouping like data together, such that a segment of data may be updated together. In general, a user of the systems and methods described herein may be unaware of the different layers of data storage. That is, a user may be unaware of the SSD layer where data is stored and gathered before it is written to sequential storage.

Hardware and software components of the present disclosure, as discussed herein, may be integral portions of a single computer or server or may be connected parts of a computer network. The hardware and software components may be located within a single location or, in other embodiments, portions of the hardware and software components may be divided among a plurality of locations and connected directly or through a global computer information network, such as the Internet. Accordingly, aspects of the various embodiments of the present disclosure can be practiced in distributed computing environments where certain tasks are performed by remote processing devices that are linked through a communications network. In such a distributed computing environment, program modules may be located in local and/or remote storage and/or memory systems.

As will be appreciated by one of skill in the art, the various embodiments of the present disclosure may be embodied as a method (including, for example, a computer-implemented process, a business process, and/or any other process), apparatus (including, for example, a system, machine, device, computer program product, and/or the like), or a combination of the foregoing. Accordingly, embodiments of the present disclosure may take the form of an entirely hardware embodiment, an entirely software embodiment (including firmware, middleware, microcode, hardware description languages, etc.), or an embodiment combining software and hardware aspects. Furthermore, embodiments of the present disclosure may take the form of a computer program product on a computer-readable medium or computer-readable storage medium, having computer-executable program code embodied in the medium, that define processes or methods described herein. A processor or processors may perform the necessary tasks defined by the computer-executable program code. Computer-executable program code for carrying out operations of embodiments of the present disclosure may be written in an object oriented, scripted or unscripted programming language such as Java, Perl, PHP, Visual Basic, Smalltalk, C++, or the like. However, the computer program code for carrying out operations of embodiments of the present disclosure may also be written in conventional procedural programming languages, such as the C programming language or similar programming languages. A code segment may represent a procedure, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the context of this document, a computer readable medium may be any medium that can contain, store, communicate, or transport the program for use by or in connection with the systems disclosed herein. The computer-executable program code may be transmitted using any appropriate medium, including but not limited to the Internet, optical fiber cable, radio frequency (RF) signals or other wireless signals, or other mediums. The computer readable medium may be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device. Computer-readable media includes, but is not to be confused with, computer-readable storage medium, which is intended to cover all physical, non-transitory, or similar embodiments of computer-readable media.

Various embodiments of the present disclosure may be described herein with reference to flowchart illustrations and/or block diagrams of methods, apparatus (systems), and computer program products. It is understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks. Alternatively, computer program implemented steps or acts may be combined with operator or human implemented steps or acts in order to carry out an embodiment of the invention.

Additionally, although a flowchart or block diagram may illustrate a method as comprising sequential steps or a process as having a particular order of operations, many of the steps or operations in the flowchart(s) or block diagram(s) illustrated herein can be performed in parallel or concurrently, and the flowchart(s) or block diagram(s) should be read in the context of the various embodiments of the present disclosure. In addition, the order of the method steps or process operations illustrated in a flowchart or block diagram may be rearranged for some embodiments. Similarly, a method or process illustrated in a flow chart or block diagram could have additional steps or operations not included therein or fewer steps or operations than those shown. Moreover, a method step may correspond to a method, a function, a procedure, a subroutine, a subprogram, etc.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

We claim:

1. A data storage system comprising:
   a first storage layer comprising a first type of storage device;
   a second storage layer comprising a second type of storage device different from the first type;
   an I/O manager to direct incoming write requests to the first storage layer; and
   a data organizer to:
      determine whether data corresponding to an incoming write request corresponds to a first existing data bucket on the first storage layer based on a comparison of data tags or meta data describing the data corresponding to the incoming write request;
      store the data in the first existing data bucket and a second existing data bucket on the first storage layer when data does correspond to the first existing data bucket;
      create a new data bucket when data does not correspond to the existing data buckets, the new data bucket to store data having data tags or meta data similar to the data corresponding to the incoming write request, and store the data in the new data bucket in the first storage layer; and
      when a data bucket reaches its corresponding data limit, move the data in the data bucket from the first storage layer to the second storage layer.

2. The data storage system of claim 1, wherein the first storage layer comprises one or more solid state drives.

3. The data storage system of claim 2, wherein the first storage layer comprises one or more flash storage devices.

4. The data storage system of claim 3, wherein the second storage layer comprises one or more sequential or semi-sequential storage devices.

5. The data storage system of claim 4, wherein the second storage layer comprises one or more shingled magnetic recording devices.

6. The data storage system of claim 1, wherein the data organizer is to review one or more tags associated with the data in a data bucket to determine the at least one similar attribute.

7. The data storage system of claim 6, wherein the at least one attribute relates to a data lifetime policy.

8. The data storage system of claim 6, wherein the at least one attribute relates to a data priority policy.

9. The data storage system of claim 6, wherein the at least one attribute relates to a data protection policy.

10. The data storage system of claim 6, wherein the at least one attribute relates to temporal locality.

11. The data storage system of claim 1, wherein the I/O manager additionally directs incoming read requests to either of the first storage layer and the second storage layer, depending on where the relevant data is stored.

12. The data storage system of claim 1, wherein the data organizer additionally moves data from the second storage layer to the first storage layer based on one or more policies.

13. The data storage system of claim 1, further comprising a segment manager to search the second storage layer for available storage space.

14. The data storage system of claim 8, wherein the segment manager to maintain a record of available space on the second storage layer.

15. A method for storing data, the method comprising:
receiving a write request for data;
determining whether data corresponding to the mite request corresponds to a first existing data bucket on the first storage layer based on a comparison of data tags or meta data describing the data corresponding to the incoming write request;
storing the data in the first existing data bucket and a second existing data bucket on the first storage layer when data does correspond to the first existing data bucket;
creating a new data bucket when data does not correspond to the existing data buckets, the new data bucket to store data having data tags or meta data similar to the data corresponding to the incoming write request, and writing the data to the new data bucket in the first storage layer comprising a first type of storage device;
grouping the data with other data having at least one similar attribute into a set of grouped data; and
when the grouped data reaches a predetermined data limit, moving the grouped data to a second storage layer comprising a second type of storage device.

16. The method of claim 15, further comprising performing a data policy operation with respect to the grouped data.

17. The method of claim 15, wherein grouping the data with other data having at least one similar attribute into a set of grouped data comprises placing the data in a data bucket based on one or more tags associated with the data.

18. The method of claim 17, wherein the one or more tags relate to at least one of a data lifetime policy, a data priority policy, a data protection policy, and temporal locality.

19. A data handling system comprising:
an I/O manager to direct incoming write requests to a first storage layer, the first storage layer comprising a first type of data storage device; and
a data organizer to:
determine whether data corresponding to an incoming write request corresponds to a first existing data bucket on the first storage layer based on a comparison of data tags or meta data describing the data corresponding to the incoming write request;
store the data in the first existing data bucket and a second existing data bucket on the first storage layer when data does correspond to the first existing data bucket;
create a new data bucket when data does not correspond to the existing data buckets, the new data bucket to store data having data tags or meta data similar to the data corresponding to the incoming write request, and store the data in the new data bucket in the first storage layer; and
when a data bucket reaches a data limit, moving the data in the bucket from the first storage layer to a second storage layer, the second storage layer comprising a second type of data storage device different from the first type;
wherein the second type of data storage device includes segments with a segment having a size that substantially corresponds to the data limit, and wherein moving the data in the bucket comprises selecting the segment from the second storage layer with the size that substantially corresponds to the data limit, and moving the data from the data bucket to the segment.

20. The data handling system of claim 19, wherein to determine whether data corresponds to the existing data bucks comprises reviewing one or more tags associated with the data.

21. The data storage system of claim 1, wherein the data organizer is to:
delete the data from the second existing data bucket when the data in the first existing data bucket is moved from the first storage layer to the second storage layer.

* * * * *

UNITED STATES PATENT AND TRADEMARK OFFICE
CERTIFICATE OF CORRECTION

PATENT NO.       : 11,112,995 B2                                    Page 1 of 1
APPLICATION NO.  : 15/796234
DATED            : September 7, 2021
INVENTOR(S)      : Bakke et al.

It is certified that error appears in the above-identified patent and that said Letters Patent is hereby corrected as shown below:

In the Claims

In Column 17, Line 18, in Claim 15, delete "mite" and insert --write-- therefor

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*